Patented July 5, 1932

1,865,968

UNITED STATES PATENT OFFICE

WALTHER SCHUPPE, OF BERLIN, GERMANY

PRODUCTION OF MONOPOTASSIUM PHOSPHATE

No Drawing. Application filed October 10, 1930, Serial No. 487,909, and in Germany October 25, 1929.

My invention refers to the production of mono-potassium phosphate.

In Letters Patent of the United States No. 1,805,873 a method of producing mono-potassium phosphate from phosphoric acid and potassium chloride is disclosed which comprises operating two stages, first producing the double salt $KH_2PO_4.H_3PO_4$ by heating potassium chloride with a quantity, in excess of the molecular quantity of dilute phosphoric acid, until the hydrochloric acid has been expelled and decomposing the acid salt obtained after cooling with so much water that mono-phosphate is separated out and a liquor formed, which is saturated with the mono-phosphate ($KH_2PO_4$) and with the double salt mentioned above. This double salt is either first isolated from the mother liquor and thereafter decomposed with a solution of mono-potassium phosphate or with water or in the heat by adding water to the reaction mixture, thus obtaining mono-potassium phosphate.

In contradistinction to this manner of proceeding which requires operating with a comparatively high concentration of phosphoric acid I have found that I can also obtain mono-potassium phosphate directly by a single-stage treatment with phosphoric acid in low concentration. I obtain this by starting from the decomposition liquor mentioned above, being a solution saturated both with mono-potassium phosphate and with the double salt $KH_2PO_4.H_3PO_4$. Into this solution potassium chloride and phosphoric acid are introduced in molecular proportion, the mixture is heated and under boiling the chlorine is expelled in the form of hydrochloric acid. The percentage of phosphoric acid in the reaction mixture and consequently also the reaction velocity can be varied by varying the proportion of the quantity of the starting liquor to the quantities of the compounds introduced into it. During the heating the reaction mixture is agitated either by a mechanical stirrer or by blowing in air or by some other suitable means. The percentage of water in the reaction mixture is kept constant by returning the condensate into the mixture. Instead of that I may however also replace the evaporated water by the addition of fresh water, by the introduction of steam or by other means. When the reaction has come to an end, the hot solution is cooled and mono-potassium phosphate is obtained as a precipitate, while the supernatant mother liquor corresponds to the starting liquor, being saturated with mono-potassium phosphate and the double salt, so that it can be reused in a succeeding operation.

The crystallized salt is separated from the liquor and, if desired, washed with water, the washing liquor being added to the fresh mixture of phosphoric acid and potassium chloride to be introduced into the liquor or better still being used for diluting the sulfuric acid acting on the raw phosphate to produce phosphoric acid.

The heating may be done directly or indirectly. If operating in suitable apparatuses such as revolving furnaces, tank furnaces, etc., the process can be carried through in a continuous manner, a mixture of mother liquor, potassium chloride and phosphoric acid being continuously introduced at one end of the furnace, while the solution to be cooled escapes at the other end.

Various changes may be made in the details disclosed in the foregoing specification without departing from the invention or sacrificing the advantages thereof.

In the claim affixed to this specification no selection of any particular modification of the invention is intended to the exclusion of other modifications thereof.

I claim:

The process of producing mono-potassium phosphate from phosphoric acid and potassium chloride comprising introducing potassium chloride and phosphoric acid in molecular proportion into a solution saturated both with mono-potassium phosphate $KH_2PO_4$ and with the double salt $KH_2PO_4.H_3PO_4$, heating the reaction mixture until the chlorine has been expelled, while maintaining the percentage of water in the mixture, cooling the resulting liquor, separating the mono-potassium phosphate precipitated on cooling and utilizing the mother liquor in a succeeding operation.

In testimony whereof I affix my signature.

WALTHER SCHUPPE.